Patented Nov. 21, 1950

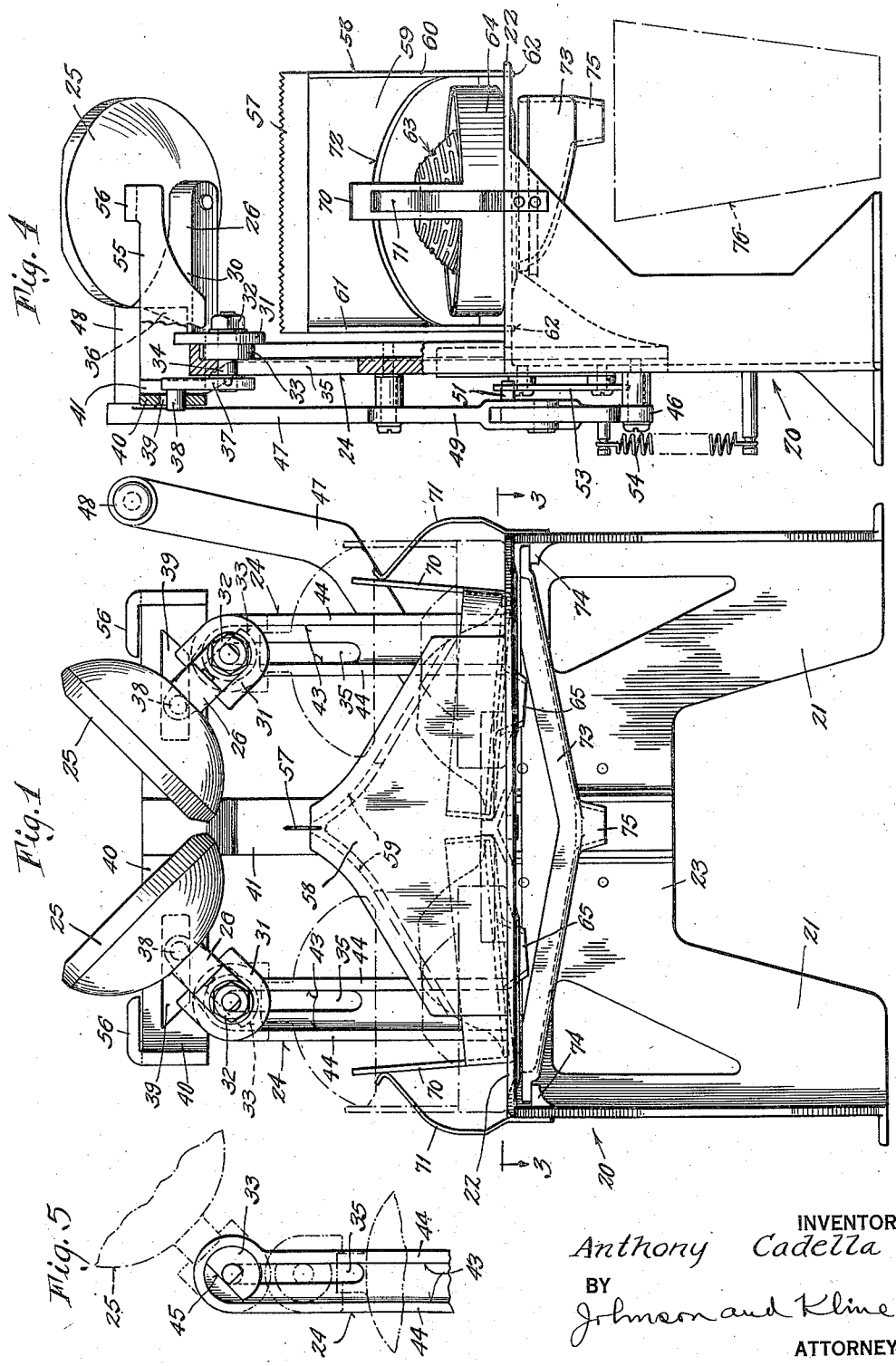

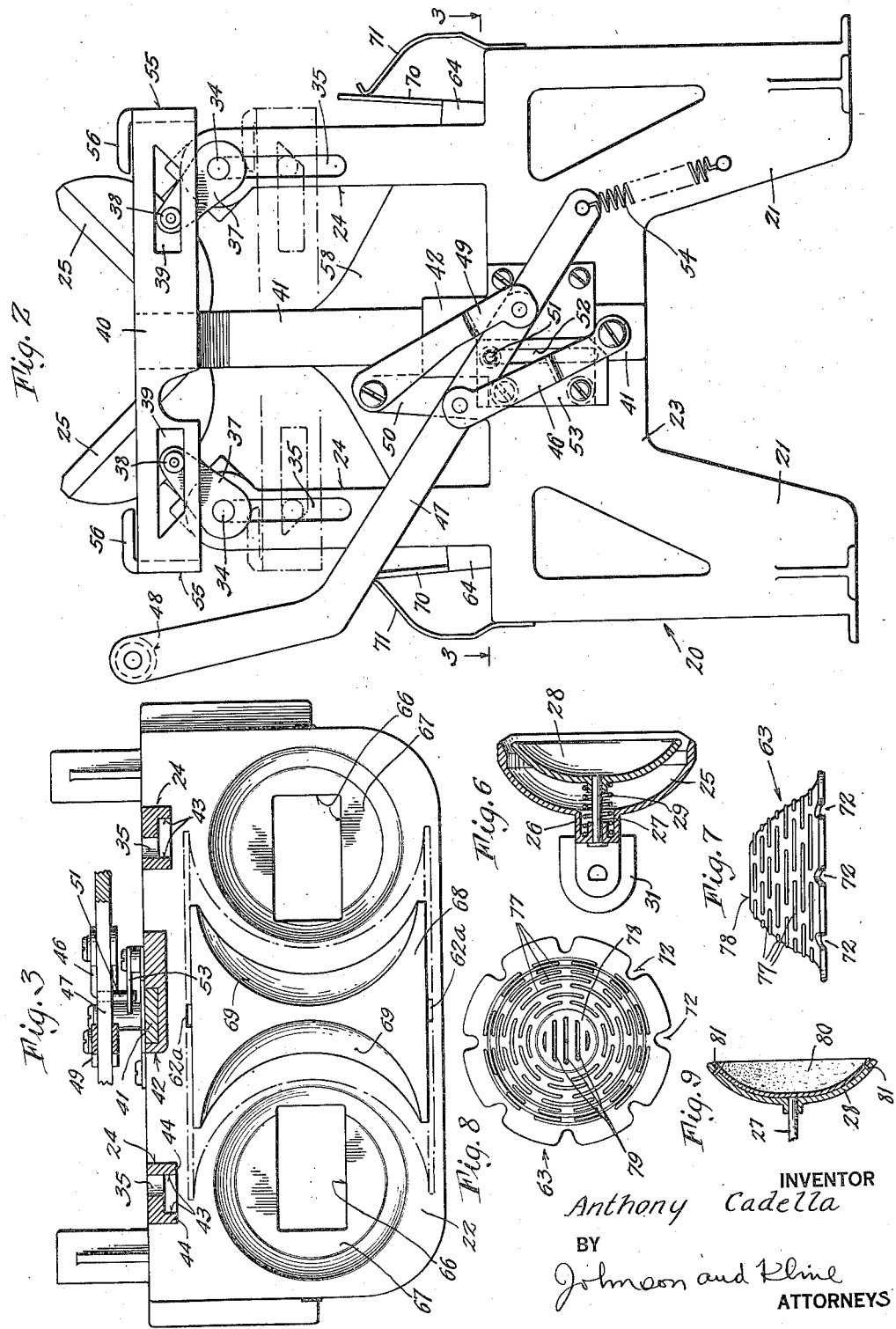

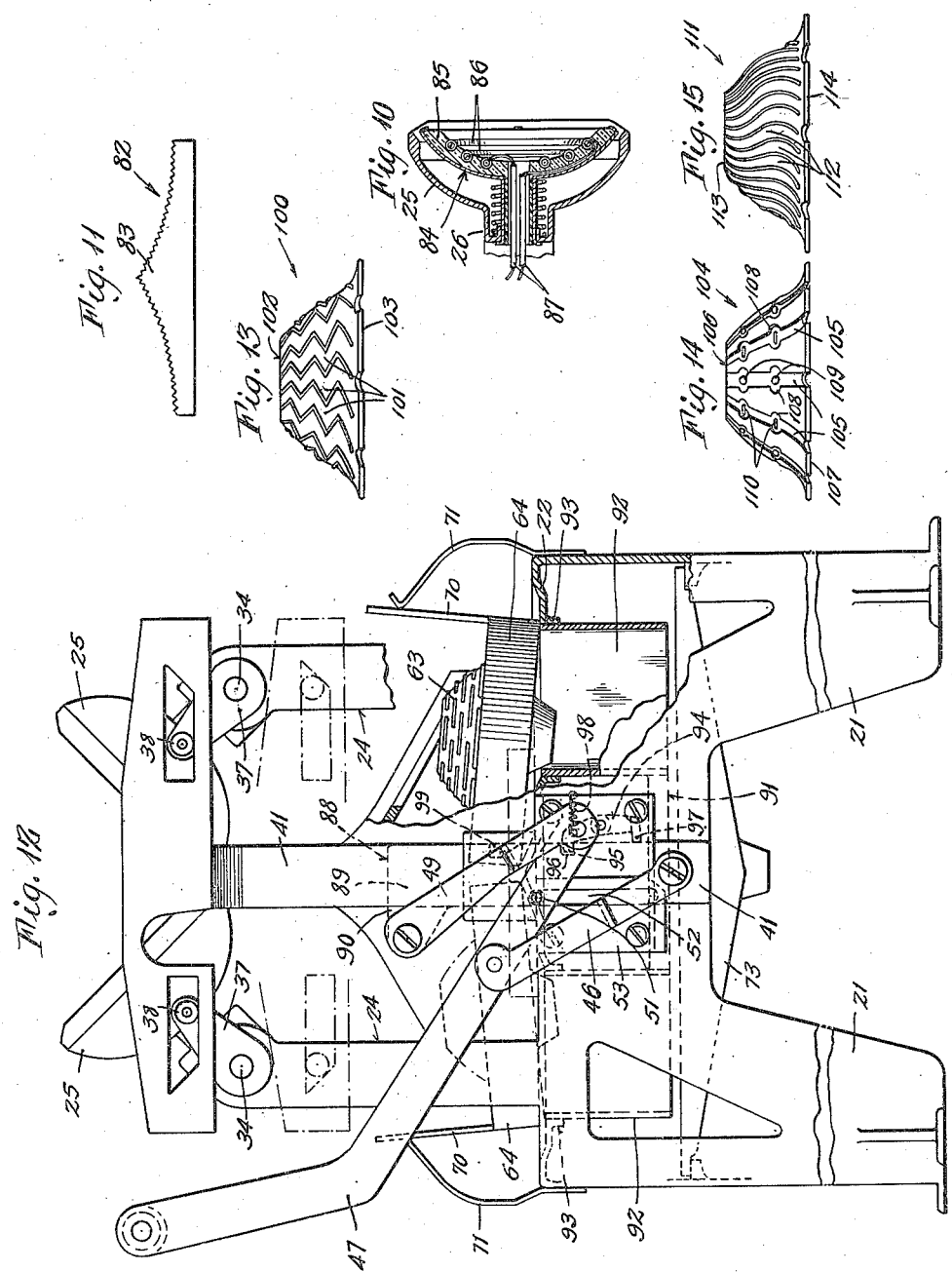

2,531,026

UNITED STATES PATENT OFFICE 2,531,026

FRUIT CUTTER AND JUICER

Anthony Cadella, Bridgeport, Conn.

Application October 23, 1947, Serial No. 781,597

12 Claims. (Cl. 100—41)

This invention relates to manually operable devices for expressing juice from fruit.

An object of the invention is to provide an improved manually operable fruit cutter and juicer which is extremely simple and convenient to use and quick in operation, while at the same time being effective to extract the maximum amount of juice from the fruit.

Another object of the invention is to provide a fruit cutter and juicer as above, which is adapted to handle fruit of different sizes with equal facility and efficiency.

A further object of the invention is to provide an improved fruit juicer which is so arranged as to prevent oils from the skin of the fruit from being present in the extracted juice.

A still further object of the invention is to provide an improved fruit juicer of the type having a bulbous member adapted to be forced into a fruit half, wherein the said member has a ribbed construction so arranged as to provide effective clog-resistant channels for conducting the juice from the fruit.

In accomplishing these objects there is provided, by the invention, a cutter and juicer mechanism into which whole fruit such as oranges may be placed, said mechanism having a pair of juxtaposed cups for engaging opposite sides of a fruit, the cups being movable in paths which approach and recede from each other and the mechanism having a knife carried between the cups and arranged to cut the fruit in half in response to movement of the cups along the said paths. The mechanism has means for displacing the contents of the fruit halves while they are being supported in the cups, thereby to express the juice from the said halves.

The preferred arrangement, as shown herein, provides for mounting the cups to swing about horizontal, parallel, spaced axes whereby the cups may be initially faced upward to receive a fruit between them, and then swung through closely spaced positions facing each other to positions facing downward, during which movement the fruit is cut in half and thereafter engaged with upwardly projecting bulbous members carried by the base of the mechanism. In the said preferred form of the invention, after the cups are positioned to face downward and the fruit halves are located in the cups and over the bulbous members, the cups are forced downward toward the bulbous members so as to cause the latter to displace the contents of the fruit halves, thereby expressing the juice therefrom. Actuating means are provided whereby the swinging and vertical movements of the cups may be performed by operation of a single member with but a single movement, thereby making the device extremely simple and quick acting in use.

Within the pivotally mounted cups other cups are movably carried, the other or inner cups being adapted to nest within the pivotal cups and being spring-urged outwardly thereof in an axial direction. By this organization, fruit such as oranges of different sizes and diameters, may be satisfactorily handled and have the juice expressed from them without difficulty.

In a modification of the invention the mechanism is arranged so that after the fruit-carrying cups are facing downward, the bulbous members, which are cooperable with the cups, are forced upward instead of having the cups continue their movement in a downward direction. In each case, however, the fruit carried by the cups is crushed by the latter and the bulbous members approaching each other, thereby to express the juice from the fruit.

The cups are provided with oil-absorbent linings in the form of blotting paper shells which directly engage the skins of the fruit halves, and at the time that the juice is being expressed from the fruit the oils which are forced from the fruit skins are absorbed by the said shells and prevented from mixing with the fruit juices. In another modification of the invention the cups are provided with electric heating coils which are energized during the operations performed on the fruit, and which are positioned so as to engage the fruit skins and ignite the oils therefrom, thereby preventing the said oils from mixing with the fruit juices.

The bulbous members which are cooperable with the cups carrying the fruit halves, are provided with ribs spaced laterally and longitudinally from each other on the fruit engaging surfaces of the members, the said ribs being disposed in staggered relation and extending generally transverse to the path of relative movement between the members and the fruit whereby continuous channels are provided for efficiently and advantageously carrying away the juices extracted from the fruit.

Other features and advantages will hereinafter appear.

In the accompanying drawings:

Figure 1 is a front elevational view of an improved fruit cutter and juicer made in accordance with the invention.

Fig. 2 is a rear elevational view of the improved fruit cutter and juicer.

Fig. 3 is a horizontal sectional view taken on lines 3—3 of Figs. 1 and 2.

Fig. 4 is a left side elevation of the fruit cutter and juicer, a slide for one of the fruit-engaging cups being shown in vertical section.

Fig. 5 is a fragmentary detail, in elevation, of a slide for one of the fruit engaging cups, together with the sliding pivot therefor.

Fig. 6 is a diametric section through one of the fruit-carrying cups.

Fig. 7 is a side elevational view of one of the bulbous members adapted to be forced into a fruit half.

Fig. 8 is a top or plan view of the member of Fig. 7.

Fig. 9 is a diametric section of a fruit-carrying cup portion and oil-absorbent lining carried thereby.

Fig. 10 is a diametric section of a fruit-carrying cup having electric heating coils incorporated therein for igniting oils expressed from the skins of the fruit.

Fig. 11 is an elevational view of a modified form of knife for use with the fruit cutting and juice extracting device.

Fig. 12 is a rear elevational view, with parts broken away and shown in section, of a modification of the invention wherein the bulbous members engaging the fruit halves are forced upwardly after the fruit has been cut, instead of the fruit-carrying cups being forced downwardly against the bulbous members, and Figs. 13, 14 and 15 are side elevational views of modified forms of bulbous members.

Referring to Figs. 1 and 2, the improved fruit cutter and juicer of this invention comprises a base 20, which is preferably formed of a casting, having a pair of legs 21, of generally angular cross-section, supporting a platform 22. The rear portions of the legs 21 are connected together by an integral web 23, and from the rear edge of the platform 22 upstanding portions 24 are provided, the said portions constituting slides on which mutually cooperable cups 25 are mounted.

Referring to Fig. 6, each cup 25 has a boss or projection 26 extending axially outward from its outside center portion, the said projection being axially bored to slidably carry a headed pin 27 extending into the cup and at its inner end having rigidly secured thereto an inner cup 28 adapted to nest in the outer cup 25. By virtue of the slidable mounting of the pin 27, the inner cup 28 may occupy an extended, partially nested position as shown in Fig. 6, or may occupy a retracted position wherein it is fully nested and closer to the inside of the outer cup 25, the inner cup being maintained in its extended position by a helical compression spring 29 as shown.

The projections 26 of the cups 25 have extensions 30 extending radially from the axes of the cups, and the said extensions may be joined to the backs of the cups along part of their lengths as shown in Fig. 4 whereby the extensions 30, projections 26 and cups 25 may be cast as single units. The extensions 30 have apertured laterally extending portions 31 at their extremities, which is secured by means of nuts 32 to enlarged, flatted portions 33 of pivot studs 34 passing through slots 35 in the slides 24. For purposes of rigidity a web 36 may be provided, connecting each cup 25 with the apertured mounting portion 31 of the extension 30. The rear ends of the pivot studs 34 carry arms 37 having rollers 38 extending into slots 39 of a horizontal crossslide 40 mounted on the upper end of the slide bar 41 which bears in a vertical slide 42 in the center rear portion of the base 20 and web 23 thereof.

As shown in Fig. 5, each upright slide 24 has a groove 43 open at the front thereof and of greater width than the slot 35, which slot extends along one side of the groove 43. At its upper end the groove 43 is enlarged in width and made to have a circular shape having a center coincidental with the center of radius of the upper circular end of the slot 35, the walls 44 of the groove having a circular shape at the upper end of the slide 24 to provide the necessary shape to the groove.

As shown in Figs. 1, 4 and 5, when the cups 25 are in their upper positions wherein they are adapted to have a fruit placed between them, the enlarged flatted portions 33 of the pivot studs 34 occupy the circular portions of the grooves 43, and the flats 45 of said stud portions extend at an angle to the vertical and substantially parallel with the axes of the associated cups 25. Due to engagement between the stud portions 33 and the circular walls 44 of the grooves 43 the pivot studs 34 will be maintained at the top ends of the slots 35 when the cups 25 are facing angularly upward as shown. The pivot studs 34 enable the cups 25 to be swung downward, however, through positions where they face each other to positions where they face vertically downward, the latter positions being indicated in the dot-and-dash outlines shown in Fig. 1. Such actuation of the cups 25 may be accomplished by lowering the slide bar 41 which carries the transverse slide 40, the latter actuating the operating arms 37 for the cups 25. The lowered position of the transverse slide 40 by which the cups 25 are made to face vertically downward is shown by the dot-and-dash outline in Fig. 2. Upon the cups 25 being made to face vertically downward, the flats 45 of the pivot studs 34 will be swung so as to extend in a vertical direction and will enable the enlarged portions 33 of the pivot studs to completely clear the walls 44 on each side of the grooves 43 in the vertical slides 24.

Therefore, further lowering of the transverse slide 40 will cause the cups 25 to be lowered vertically, after they are facing downward, to positions below the dot-and-dash line positions shown in Fig. 1.

Actuation of the slide bar 41 to effect these movements of the cups 25 is accomplished by a link 46, Fig. 2, at its lower end pivotally connected to the slide bar 41, the upper end of the link being conected with a manually operable lever 47 having a handle 48 at its upper extremity as viewed in Figs. 1 and 2. The lower end of the lever 47 is pivotally connected with the lower end of a link 49 whose upper end is pivotally secured to an upstanding arm 50 on the base 20. The lever 47 carries a pin 51 riding in a slot 52 of a guide plate 53 secured to the base 20 whereby the movement of the lever 47 is maintained within a predetermined path or zone.

Referring to Fig. 2, when the lever 47 is in the uppermost position shown, the slide bar 41 is in its uppermost position and the cups 25 are facing angularly upward to receive a whole fruit. When the lever 47 is forced downwardly it will force the slide bar 41 downward, thereby swinging the cups 25 downward and at first towards each other to an aligned position, and thereafter away from each other to a downwardly facing position, whereupon further downward movement of the lever 47 will cause the cups 25 to move vertically downward. Reverse movement of the lever 47, which may be effected by an extension spring 54, Fig. 2, will return the cups to their fruit-receiving positions shown. Preferably the outer ends of the slots 39 in the horizontal cross slide 40 are angularly disposed as shown, so that when the lever 47 is started in its reverse movement, the angular ends of the slots will cam the rollers 38 inward, thereby shifting the arms 37 from their downward dead-center positions and providing a starting movement for the said arms and the cups 25.

The cross-slide 40 may be provided with forwardly projecting extensions 55 having inturned ears 56 adapted to engage the cups 25 and function as stops therefor.

For the purpose of cutting in half a whole fruit which may be placed between the cups 25, a knife 57 is provided, Figs. 1 and 4, mounted on a knife-carrier 58 having sloping sides 59 and front and rear walls 60 and 61 respectively. As shown in Fig. 1 the walls 60 and 61 of the knife carrier extend below the lower edges of the sloping sides 59 and rest on the platform 22 of the base 20, the said walls having fingers 62 extending into openings 62a of the platform whereby the knife carrier 58 is positioned against shifting.

During the downward swinging movement of the cups 25 a whole fruit carried between the cups will be engaged and cut in half by the knife 57, and the fruit halves will have a controlled sliding movement down the sloping sides 59 of the knife carrier 58, the control being effected by the cups 25, or more correctly by the inner cups 28 carried by the cups 25.

It will be noted that, by the provision of the spring-urged inner cups 28, fruit of different sizes or diameters may be placed between the cups and will be effectively handled without looseness and accurately cut in half, since larger fruit will cause the springs 29 to compress greatly whereas smaller fruit will cause only slight compression of the springs 29. In either case, constant pressure is maintained on the fruit by the inner cups 28 whereby the fruit is properly handled and controlled.

For cooperation with the cups 25, and for the purpose of displacing the contents of the fruit halves carried by the cups whereby juice is extracted from the halves, bulbous members 63 are provided mounted in shallow cup-shaped carriers 64 respectively, the said carriers having ducts 65 extending downwardly from their bottom walls and extending through slots 66, Fig. 3, in the platform 22, which platform has dished or depressed portions 67 surrounding the slots 66 as shown. The platform 22 also has a raised portion 68 extending centrally from front to rear, the said raised portion having crescent-shaped sloping surfaces 69 on which the carriers 64 may ride. The sloping surfaces 69 of the portion 68 merge and blend with the upper surface of the platform 22 along circular lines as indicated in Fig. 3, there being, however, no step or shoulder at the points of merging whereby the carriers 64 may be slid inward toward each other and up on the surfaces 69 without meeting obstruction.

To accomplish this inward movement of the carriers 64 automatically, the carriers are provided with upstanding arms 70 engaged by leaf springs 71 secured at their lower ends to the base 20. Referring to Fig. 1, the carriers 64 are slidable from the closely spaced positions shown to more widely spaced positions as indicated by the dot-and-dash outlines wherein the leaf springs 71 are forced outwardly or away from each other, such sliding outward movement being effected as a consequence of the edge portions of the cups 25 engaging the upstanding fingers 70 of the carriers as indicated. The carriers 64 and bulbous members 63 are therefore normally located in closely spaced positions, as shown in Fig. 1, by the springs 71.

The sloping sides 59 of the knife carrier 58 have inwardly curved lower edges 72, and the halves of a fruit which has been cut by the knife 57 will, in descending along the sloping sides of the knife carrier, be transferred therefrom directly onto the bulbous members 63. As the cups 25 swing downward further, movement of the cups will shift the bulbous members and the fruit halves, together with the carriers 64 outwardly from the center to the dot-and-dash positions of Fig. 1. When the cups 25 face vertically downward the fruit halves will be substantially centrally located between the cups and the bulbous members 63, and further descending movement of the cups will force the fruit halves against the members 63, the latter penetrating the fruit halves and expressing the juice therefrom.

As shown in Figs. 7 and 8, the lower edges of the bulbous members 63 have notches 72 whereby the fruit juices may flow along the bottoms of the carrier 64 and out of the ducts 65 thereof.

For the purpose of collecting the juice passing through the ducts 65 a trough 73 is provided, supported on lugs 74 of the base 20, the trough having a central spout 75 below which a tumbler 76, Fig. 4 may be placed.

According to the present invention, the bulbous members 63 have a novel shape whereby when they are forced into a fruit half to displace the contents thereof the juices will flow readily over the surfaces of the members. As shown, the members are provided with ribs 77 which are spaced laterally and longitudinally from each other, the said ribs being disposed in staggered relation and extending generally circumferentially whereby the spaces between the ribs constitute channels. By having the ribs closely spaced and in staggered relation there is less tendency for the channels becoming clogged with the pulp of the fruit, and therefore the juices will flow freely down the outside of the members. The tops 78 of the members are preferably substantially flat and provided with slots 79 to further facilitate the flow of juice from the fruit.

Means are provided, according to the invention, for preventing oils from the skins of the fruit from flowing down and mixing with the fruit juices. In accomplishing this, referring to Fig. 9, an absorbent lining 80 is provided for each of the inner cups 28. The lining 80 may be formed of blotting paper or any other suitable substance, having a hollow shape and being retained in the cup 28 by prongs 81 carried by the cup and piercing the lining. When a fruit half is squeezed between a cup 25 and bulbous member 63 whatever oils are pressed from the skin of the fruit will be absorbed by the lining 80 and trapped thereby, and prevented from mixing with the fruit juices.

Referring to Fig. 11, a modified form of knife 82 having a central raised portion 83 may be provided in place of the knife 57, the knife 82 being better adapted to penetrate tough-skinned fruit than the knife 57.

In accordance with the invention means are provided whereby the oils from the skins of the fruit may be ignited and burned, to prevent their mixing with the juice. In accomplishing this, the cups 25 may be provided with inner cups 84 having ceramic linings 85 in which are embedded heating coils 86, the leads 87 for the coils coming out through the projections 26 of the cups 25. Any suitable automatic means may be provided for energizing the heating coils 86 during operation of the juicing device, whereby the coils become incandescent and ignite or burn the oils which are pressed out of the fruit skins.

A modification of the invention is shown in Fig. 12 wherein the bulbous members 63 are forced upwardly instead of remaining stationary after fruit halves are deposited on them by the downwardly faced cups 25. In this figure, parts similar to those already described have been given similar characters. In accomplishing this movement of the members 63, a vertical slide 88 is provided on the base 20, the upper end 89 of the slide having an ear 90 to which the upper end of the link 49 is pivotally connected. The slide 88 has a cross-member 91 having at both its ends hollow or box-like portions 92 which are vertically slidable in guides 93 bounding the slots 66 in the platform 22. The box-like portions 92 are adapted to engage the undersides of the carriers 64 and to lift the said carriers and members 63 when the slide 88 is raised.

During the swinging movements of the cups 25, the slide 88 is locked against movement by a latch 94 pivotally secured to the base 20 and having a finger 95 entering a slot 96 in the slide 88. The latch 94 has a second finger 97 engageable with the side edge of the slide bar 41 which carries the cross-slide 40, and such engagement prevents any turning of the latch. An extension spring 98 is connected between the latch 94 and base 20 to urge the latch in a clockwise direction whereby the finger 95 thereof will leave the notch 96 when the latch is free to move. A notch 99 is provided in the side edge of the slide bar 41, and as the latter is lowered to swing the cups 25 downward to their positions facing vertically down, the notch 99 will approach the finger 97 of the latch 94 and finally the finger will be enabled to enter the notch. When this occurs, the finger 95 of the latch 94 will leave the notch 96 of the slide 88, thereby freeing the latter slide for movement, and continued movement of the lever 47 will now cause the slide 88 to move upward, lifting the carriers 64 and bulbous members 63, and thereby causing the members to penetrate the fruit halves and express the juice therefrom.

A modified form of bulbous member is shown in Fig. 13. The member 100 shown therein has a plurality of zig-zag channels 101 in its fruit-engaging surface, the channels being arranged to extend generally from the apex 102 of the member to the notched base 103 thereof. It will be seen that portions of the channels 101 are in staggered relation to each other and extend across the path of relative movement between the member and the fruit. This results in an advantageous action which is extremely effective in crushing the pulp of the fruit and at the same time providing clog-resistant passages for the fruit juices.

Another form of bulbous member is shown in Fig. 14. The member 104 shown therein has channels 105 in its fruit-engaging surface, the said channels extending generally from the apex 106 of the member to the notched base 107 thereof. The channels 105 have enlarged portions 108 in which are disposed circular nibs 109 and elongate nibs 110.

The nibs 109 and 110, together with the shoulders provided at the enlarged portions 108 of the channels 105 act to crush the pulp of the fruit as the member is forced into the fruit, and by this construction, therefore, an effective breaking-down action of the fruit pulp is had, while at the same time the channels 105 provide for efficient removal of the fruit juices.

Fig. 15 shows a modified form of bulbous member 111 having a plurality of channels 112 in its fruit-engaging surface, the said channels extending generally from the apex portion 113 of the member to the notched base portion 114 along a tortuous path, and being generally of curved outline as indicated. The raised parts of ribs between the channels 112 have portions which extend across the path of relative movement between the member and the fruit, thereby to provide an effective pulp-crushing action while at the same time enabling the fruit juices to freely flow down the surface of the member.

Variations and modifications may be made within the scope of this invention and portions of the improvements may be used without others.

I claim:

1. In a fruit juice extractor, a base; a pair of juxtaposed pressure-applying cups for engaging opposite sides of a fruit; means for operatively mounting the cups on the base, said means providing for pivotal movement of the cups in paths about substantially parallel axes and between substantially the same planes; a knife mounted on the base between the paths of movement of the cups; means including a pivoted lever manually operable in one direction about its pivot for actuating the cups simultaneously from positions facing generally in one direction wherein a fruit may be placed between the cups, through positions facing toward each other to positions facing generally in another direction whereby the fruit in the cups is moved against and cut in half by the knife, said mounting means enabling the cups when facing in said other direction to be translationally moved; means whereby on continued movement of said lever in the said one direction about its pivot said cups are moved translationally, and means cooperable with the cups when the latter are moved translationally, for displacing the contents of the fruit halves carried in the cups to express juice from said halves.

2. In a fruit juice extractor, a pair of juxtaposed cups for engaging opposite sides of a fruit, said cups being pivotally movable about axes fixedly spaced from each other whereby the cups may be swung to and from positions facing each other; a second pair of cups respectively carried by and nestable in the first-mentioned cups, said cups of the second pair being respectively movable axially thereof between extended, partially nested positions and retracted fully nested positions in the first cups, and being spring-urged toward their extended positions, thereby to provide for fruit of different sizes which are inserted between the cups being firmly gripped when the cups are substantially facing each other; means for cutting in half a fruit, carried between the cups, in response to movement of said cups about their axes; means cooperable with the cups for displacing the contents of fruit halves carried in the cups to express juice from said halves; and means carried by the second pair of cups for igniting oils pressed from the fruit skin during the expressing of juice from the fruit.

3. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved; and means cooperable with the cups when the latter are moved vertically downwardly, for displacing the contents of the fruit halves carried in the cups to express juice from said halves, said means including bulbous members adapted to be forced into the fruit halves to displace the contents thereof, said members being laterally movable on the base and moving with the cups respectively as the latter approach the said positions facing downwardly, thereby to facilitate positioning of the fruit halves between the cups and members.

4. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved; means cooperable with the cups when the latter are moved vertically downwardly, for displacing the contents of the fruit halves carried in the cups to express juice from said halves, said means including bulbous members adapted to be forced into the fruit halves to displace the contents thereof, said members being laterally movable on the base; and means responsive to movement of the cups for moving the bulbous members simultaneously with the cups respectively as the latter approach the said positions facing downwardly, thereby to facilitate positioning of the fruit halves between the cups and members.

5. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved; means cooperable with the cups when the latter are moved vertically downwardly, for displacing the contents of the fruit halves carried in the cups to express juice from said halves, said means including a pair of upright shallow cups movable laterally and substantially horizontally on the base, and including a pair of bulbous members respectively carried by the cups and adapted to be forced into the fruit halves to displace the contents thereof; and means for moving the shallow cups and the bulbous members carried thereby simultaneously with the pressure-applying cups when the latter are facing downwardly, thereby to facilitate positioning of the fruit halves on the bulbous members, said means being carried by the shallow cups and being engageable with the pressure-applying cups.

6. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved; and means cooperable with the cups when the latter are moved vertically downwardly, for displacing the contents of the fruit halves carried in the cups to express juice from said halves, said means including bulbous members adapted to be forced into the fruit halves to displace the contents thereof, said members being laterally movable on the base between closely spaced positions for initially engaging the fruit halves and widely spaced juice-expressing positions; spring means for moving said members from their widely spaced to closely spaced positions; and means responsive to movement of the cups for moving the members simultaneously with the cups respectively and against said spring means as the cups approach their positions facing downwardly, thereby to facilitate positioning of the fruit halves between the cups and members.

7. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means including a pivoted lever manually operable in one direction about its pivot for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved downwardly, means whereby on continued movement of said lever in the said one direction about its pivot said cups are moved downwardly; and means cooperable with the cups when the latter are moved vertically downwardly, for displacing the contents of the fruit halves carried in the cups to express juice from said halves.

8. In a fruit juice extractor, a base; a pair of juxtaposed pressure-applying cups for engaging opposite sides of a fruit; means for operatively mounting the cups on the base, said means providing for pivotal movement of the cups in paths about substantially parallel axes and between substantially the same planes; a knife mounted on the base between the paths of movement of the cups; means for actuating the cups simultaneously from positions facing generally in one direction wherein a fruit may be placed between the cups through positions facing toward each other to positions facing generally in another direction whereby the fruit in the cups is moved against and cut in half by the knife, said mounting means enabling the cups when facing in said other direction to be translationally moved and said means for actuating the cups including means for shifting the cups translationally; and means cooperable with the cups when the latter are shifted translationally for displacing the contents of the fruit halves carried in the cups to express juice from said halves, said means for actuating the cups comprising a manually operable lever, a vertical slide controlled by the lever, a horizontal slide carried by the vertical slide, and comprising arms controlled by the horizontal slide and connected with said cups.

9. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing toward each other to positions facing downwardly, whereby the fruit in the cups is moved against and cut in half by the knife, said mounting means enabling the cups when facing downwardly to be vertically moved; and means cooperable with the cups when the latter are moved vertically downwardly, for displacing the contents of the fruit halves carried in the cups to express juice from said halves, said means including bulbous members adapted to be forced into the fruit halves to displace the contents thereof, said members being movable in an arc on the base and moving with the cups respectively as the latter approach the said positions facing downwardly, thereby to facilitate positioning of the fruit halves between the cups and members.

10. In a fruit juice extractor, a base; a pair of juxtaposed pressure-applying cups for engaging opposite sides of a fruit; means for operatively mounting the cups on the base, said means providing for pivotal movement of the cups in paths about substantially parallel axes and between substantially the same planes; a knife mounted on the base between the paths of movement of the cups; means for actuating the cups simultaneously from positions facing generally in one direction wherein a fruit may be placed between the cups, through positions facing toward each other to positions facing generally in another direction, whereby the fruit in the cups is moved against and cut in half by the knife, said mounting means enabling the cups when facing in said other direction to be translationally moved, and said means for actuating the cups including means for shifting the cups translationally when the cups face generally in said other direction; and means cooperable with the cups when the latter are shifted translationally, for displacing the contents of the fruit halves carried in the cups to express juice from said halves, said means for actuating the cups comprising a manually operable lever, a vertical slide controlled by the lever, a horizontal slide carried by the vertical slide and having slots therein with angularly disposed ends, and comprising pivoted arms controlled by the horizontal slide and connected with said cups, said arms having lugs extending into the slots of the horizontal slide and engageable with the angularly disposed ends thereof when the arms are in dead center positions whereby movement of the slides causes the lugs of the arms to be cammed to shift the arms from said dead-center positions.

11. In a fruit juice extractor, a base; a pair of juxtaposed pressure-applying cups for engaging opposite sides of a fruit; means for operatively mounting the cups on the base, said means providing for pivotal movement of the cups in paths about substantially parallel and substantially horizontal axes and between substantially the same vertical planes; a knife mounted on the base between the paths of movement of the cups, said knife extending below the axes of movement of the cups; means for actuating the cups simultaneously from positions facing upwardly wherein a fruit may be placed between the cups, through positions facing toward each other to positions facing downwardly, whereby the fruit in the cups is moved against and cut in half by the knife, said mounting means enabling the cups when facing downwardly to be vertically moved; and means cooperable with the cups when the latter are moved vertically downwardly, for displacing the contents of the fruit halves carried in the cups to express juice from said halves, said means including bulbous members adapted to be forced into the fruit halves to displace the contents thereof, and including carriers for said members, movably supported on the base, said carriers having depending spouts through which fruit juice may pass and said base having slots into which the spouts extend, the carriers and bulbous members being laterally movable and moving with the cups respectively as the latter approach the said positions facing downwardly thereby to facilitate the positioning of the fruit halves between the cups and members.

12. In a fruit juice extractor, a base; a pair of juxtaposed pressure-applying cups for engaging opposite sides of a fruit; means for operatively mounting the cups on the base, said means providing for pivotal movement of the cups in paths about substantially parallel axes and between substantially the same planes; a knife mounted on the base between the paths of movement of the cups; means for actuating the cups simultaneously from positions facing generally in one direction wherein a fruit may be placed between the cups, through positions facing toward each other to positions facing generally in another direction whereby the fruit in the cups is moved against and cut in half by the knife, said mounting means enabling the cups when facing in said other direction to be translationally moved, and said means for actuating the cups including means for shifting the cups translationally when the cups face generally in said other direction; and means cooperable with the cups when the latter are shifted translationally, for displacing the contents of the fruit halves carried in the cups to express juice from said halves, said means for actuating the cups comprising a manually operable lever, a link connected between the lever and the base and providing a movable fulcrum for the lever, a vertical slide, a second link connecting the lever with the vertical slide, guide means between the lever and the base, and means connected between the vertical slide and said cups for operating the latter in response to movement of the slide.

ANTHONY CADELLA.

REFERENCES CITED

The following references are of record in the file of this patent:

UNITED STATES PATENTS

| Number | Name | Date |
|---|---|---|
| 253,353 | Dean | Feb. 7, 1882 |
| 593,548 | Baumgarten et al. | Nov. 9, 1897 |
| 644,736 | Easley | Mar. 6, 1900 |
| 713,034 | White | Nov. 4, 1902 |
| 1,764,158 | Edwards | June 17, 1930 |
| 1,888,528 | Faulds | Nov. 22, 1932 |
| 1,924,392 | Barnes | Aug. 29, 1933 |
| 2,004,056 | Pipkin | June 4, 1935 |
| 2,024,917 | Franze | Dec. 17, 1935 |
| 2,147,870 | Watkins | Feb. 21, 1939 |
| 2,155,425 | LaMere | Apr. 25, 1939 |
| 2,220,372 | Johnson | Nov. 5, 1940 |
| 2,245,726 | Seyfried | June 17, 1941 |
| 2,261,150 | Ewald | Nov. 4, 1941 |
| 2,270,007 | McKinnis | Jan. 13, 1942 |
| 2,311,565 | Nelson | Feb. 16, 1943 |
| 2,313,318 | Brown | Mar. 9, 1943 |
| 2,346,029 | Jennings | Apr. 4, 1944 |
| 2,354,721 | Walker et al. | Aug. 1, 1944 |
| 2,419,848 | Morey | Apr. 29, 1947 |
| 2,420,679 | Pipkin | May 20, 1947 |
| 2,496,012 | Morey | Jan. 31, 1950 |